United States Patent [19]

Hudgens

[11] Patent Number: 4,846,317

[45] Date of Patent: Jul. 11, 1989

[54] STRUT WITH CONTROLLED VARIABLE DAMPING RATE

[75] Inventor: Bernard C. Hudgens, West Lafayette, Ind.

[73] Assignee: TRW Inc., Lyndhurst, Ohio

[21] Appl. No.: 89,320

[22] Filed: Aug. 25, 1987

[51] Int. Cl.⁴ .............................................. F16F 9/34
[52] U.S. Cl. ................................... 188/299; 188/288; 188/322.14; 188/322.15
[58] Field of Search ............... 188/275, 279, 280, 281, 188/282, 285, 288, 289, 299, 322.14, 322.13, 322.15; 267/64.18, 64.19, 64.22, 64.23, 217

[56] References Cited

U.S. PATENT DOCUMENTS

| | | | |
|---|---|---|---|
| 2,992,836 | 7/1961 | Vogel | 267/64.22 |
| 3,039,566 | 6/1962 | Rubsey | 188/299 |
| 4,293,139 | 10/1981 | Brown | 280/6 |
| 4,356,898 | 11/1980 | Guzder et al. | 188/280 |
| 4,468,050 | 8/1984 | Woods et al. | 280/707 |
| 4,596,320 | 6/1986 | Shimokura et al. | 188/299 |
| 4,597,411 | 7/1986 | Lizell | 188/322.15 |
| 4,600,215 | 7/1986 | Kuroki et al. | 280/707 |
| 4,723,640 | 2/1988 | Beck | 188/280 X |
| 4,729,459 | 3/1988 | Inagaki et al. | 188/299 |
| 4,732,408 | 3/1988 | Ohlin | 188/299 X |

FOREIGN PATENT DOCUMENTS 0621630 4/1949 United Kingdom ........... 188/322.14
2143390 2/1985 United Kingdom ............... 188/299

*Primary Examiner*—Andres Kashnikow
*Assistant Examiner*—Matthew C. Graham
*Attorney, Agent, or Firm*—Tarolli, Sundheim & Covell

[57] ABSTRACT

An apparatus for damping relative movement of parts. The apparatus includes a cylinder defining a fluid chamber. A piston is located in the fluid chamber and divides the fluid chamber into first and second fluid chamber portions. The piston is connected to one of the parts and the cylinder is connected to the other of the parts. The piston and cylinder move relatively in compression and expansion strokes to damp relative movement of the parts. A fluid reservoir is in fluid communication with the first fluid chamber portion. A first valve controls fluid flow from the first fluid chamber portion into the fluid reservoir upon movement of the piston and cylinder during a compression stroke. A damping control provides a variable damping force resisting movement of the piston and cylinder during an expansion stroke. The damping control includes a second valve movable with the piston for controlling the fluid flow from the second fluid chamber portion to the first fluid chamber portion. The second valve opens by fluid pressure in the fluid second chamber portion. A variable force is applied to the second valve to resist opening of the second valve.

19 Claims, 9 Drawing Sheets

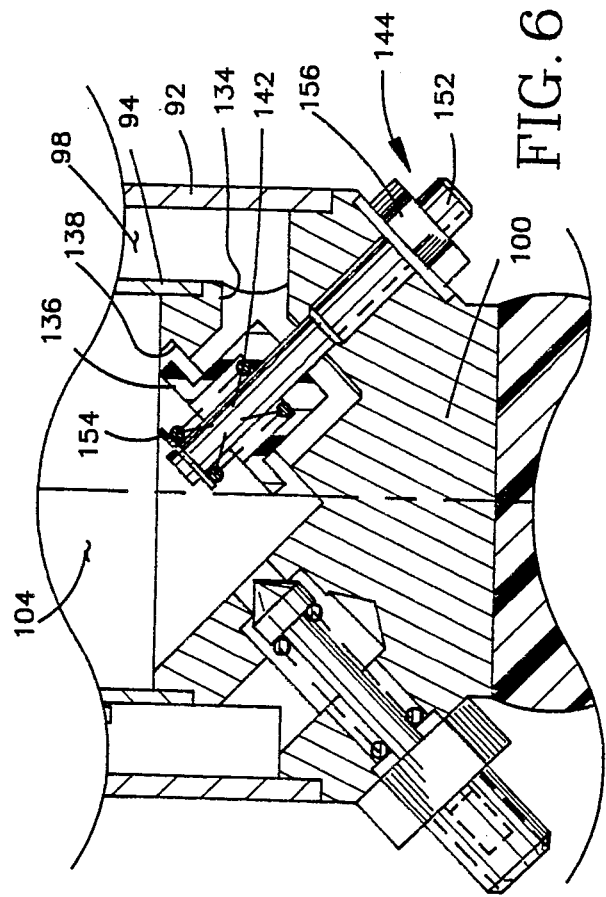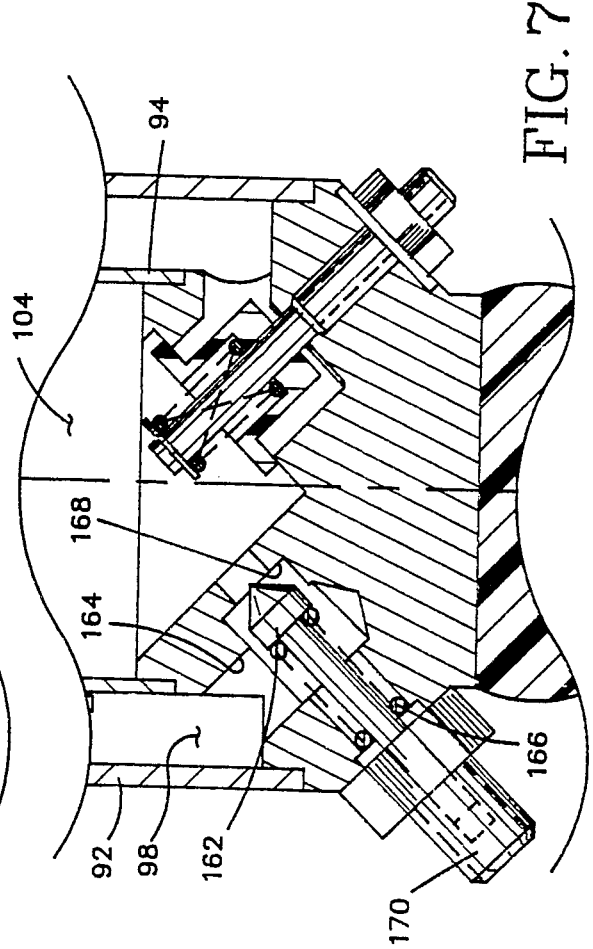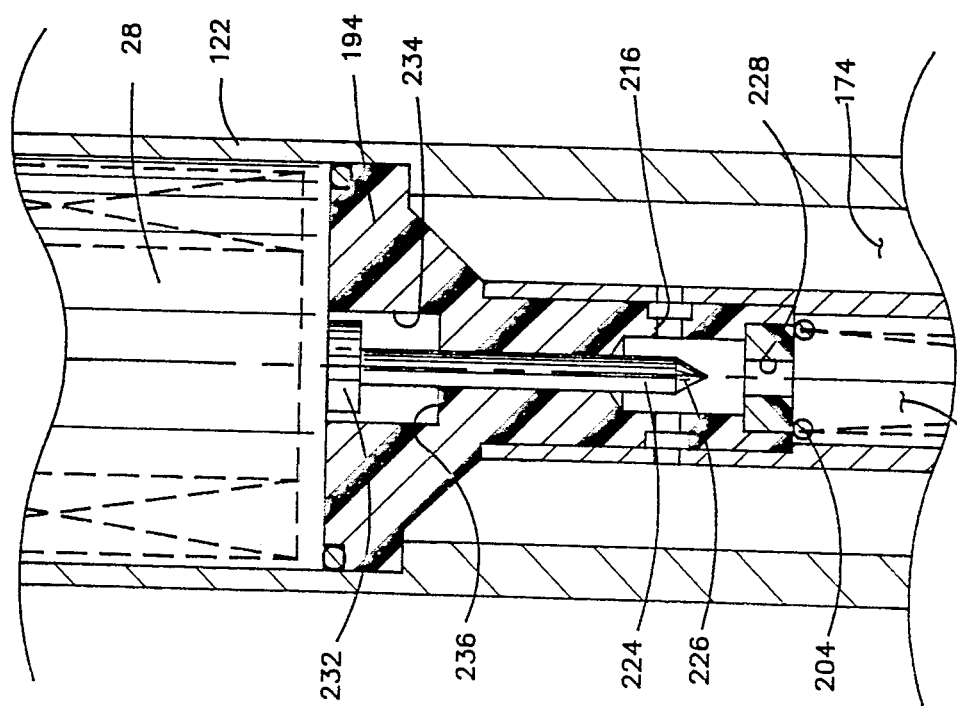

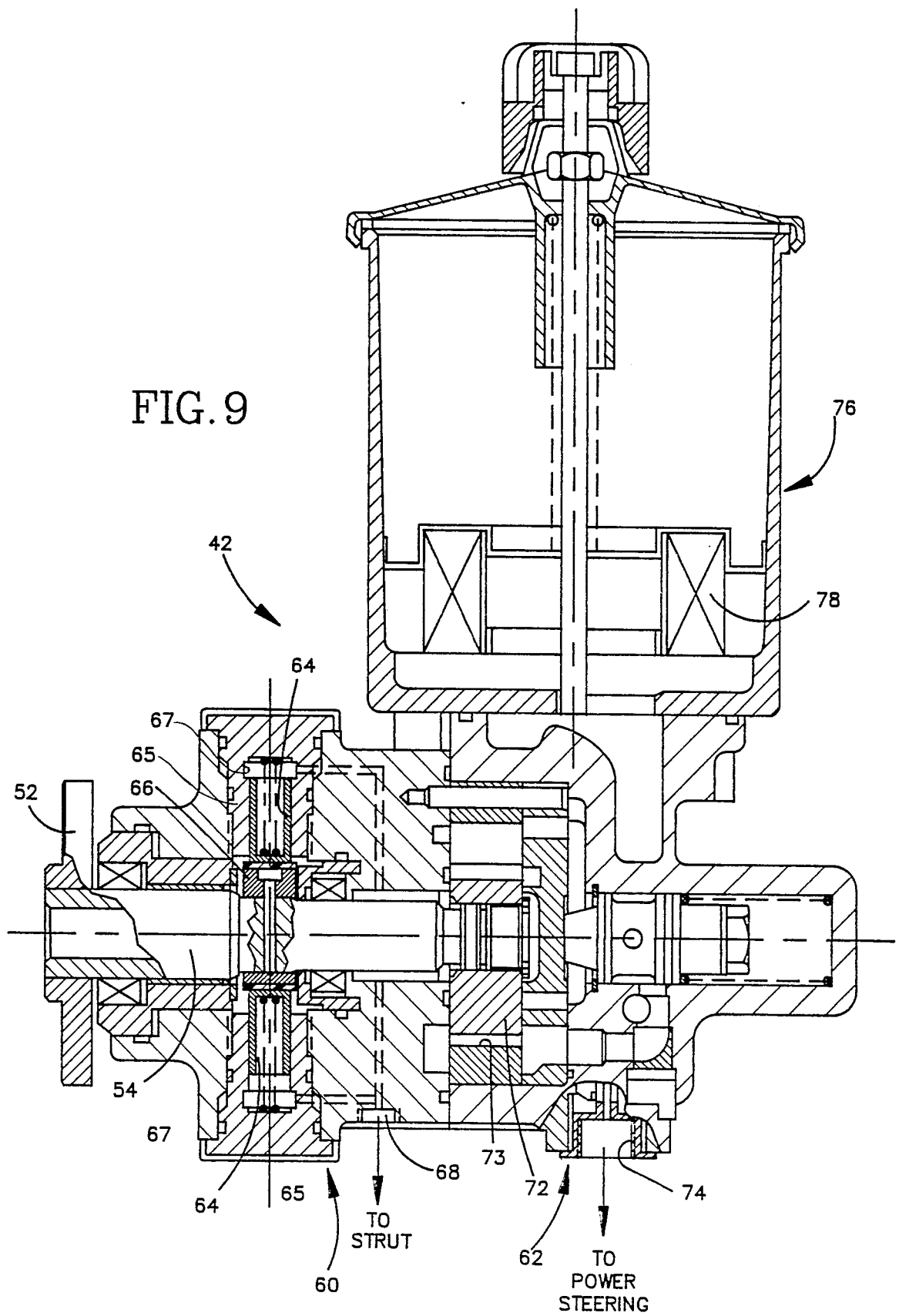

STRUT WITH CONTROLLED VARIABLE DAMPING RATE

BACKGROUND OF THE INVENTION

The present invention relates to fluid damping of parts, and more particularly, to a damping system for connecting relatively movable parts of an automotive vehicle. The invention further relates to maintaining an optimun relationship between the relatively movable parts of the vehicle as the load carried by the vehicle changes.

Damping systems for use in an automotive vehicle are known. Known damping systems include shock absorbers and typically take the form of a strut. The strut is connected between the vehicle frame or body and a vehicle wheel mounting support, such as a spindle or axle. Some known fluid damping systems are disclosed in U.S. Pat. Nos. 2,992,836; 4,293,139; 4,468,050; 4,596,320; and 4,600,215.

SUMMARY OF THE INVENTION

The present invention is directed to an apparatus for damping relative movement of parts. The parts may be an automotive vehicle frame and a vehicle axle. The apparatus of the present invention is relatively compact and provides variable damping of the parts.

The apparatus is preferably a vehicle strut which includes a cylinder defining a fluid chamber. A piston is located in the fluid chamber and divides the fluid chamber into first and second fluid chamber portions. The piston is connectable with one of the parts and the cylinder is connectable with the other of the parts. The piston and cylinder are relatively movable in compression and expansion strokes to damp relative movement of the parts. A fluid reservoir is in fluid communication with the first fluid chamber portion.

A first valve controls fluid flow from the first fluid chamber portion to the fluid reservoir upon relative movement of the piston and cylinder during a compression stroke. A damping controller provides a variable damping force for resisting relative movement of the piston and cylinder during an expansion stroke. The damping controller includes a second valve movable with the piston for controlling the fluid flow from the second fluid chamber portion to the first fluid chamber portion. The second valve is opened by fluid pressure in the second fluid chamber portion to allow fluid flow from the second fluid chamber portion to the first fluid chamber portion. A variable force is applied to the second valve to resist opening of the second valve. An actuator applies the variable force to the second valve in response to receiving an electric signal. The actuator is a solenoid which applies a force to the second valve in proportion to a characteristic of the electric signal, such as voltage. An electronic control unit generates the electric signal in response to a sensor sensing a condition of the vehicle, such as speed, steering position, or the length of the strut.

The second valve has an elongate body. A tapered end portion extends axially of the elongate body. The elongate body is disposed in a passage carried by the piston. The passage connects the first and second fluid chamber portions for fluid communication. Fluid pressure in the second fluid chamber portion progressively increases during an expansion stroke when the passage is blocked by the elongate body. Fluid pressure in the second fluid chamber portion acts on the tapered end portion of the elongate body. When the pressure reaches a level high enough to overcome the resistance acting to prevent movement of the elongate body, the elongate body is moved to a position within the passage allowing fluid flow from the second fluid chamber portion to the first fluid chamber portion.

A fluid power steering pump has a first pumping section providing fluid to the power steering system of the vehicle. The fluid power steering pump also has a second pumping section providing fluid to one of the fluid chamber portions to effect expansion of the strut. A sensor senses a change in length of the strut. The sensor communicates with the electronic control unit. A valve is controlled by the electronic control unit for directing fluid from the second pumping section of the fluid pump to the one fluid chamber portion in response to the sensor sensing a decrease in the length of the strut from a predetermined length.

A fixed charge of gas pressure acts on the fluid in the fluid reservoir. A third valve controls fluid flow from the fluid reservoir into the first fluid chamber portion during the expansion stroke. The third valve opens in response to a predetermined pressure differential between the fluid reservoir and the first fluid chamber portion.

A piston rod is connected to the piston and extends through the second fluid chamber portion. The piston rod is hollow and defines a pair of concentric fluid chambers. One of the pair of fluid chambers communicates freely with the first fluid chamber portion. The other of the pair of concentric fluid chambers communicates with the second fluid chamber portion through a check valve. The aforementioned second valve controls fluid flow between the pair of concentric fluid chambers.

BRIEF DESCRIPTION OF THE DRAWINGS

Further features of the present invention will become apparent to those skilled in the art to which the present invention relates from reading the following specification with reference to the accompanying drawings, in which:

FIGS. 6-8 are views similar to FIGS. 3 and 5 with parts in different positions;

FIG. 9 is a sectional view of a power steering pump in the system of FIG. 1;

DESCRIPTION OF A PREFERRED EMBODIMENT

Figure 1:
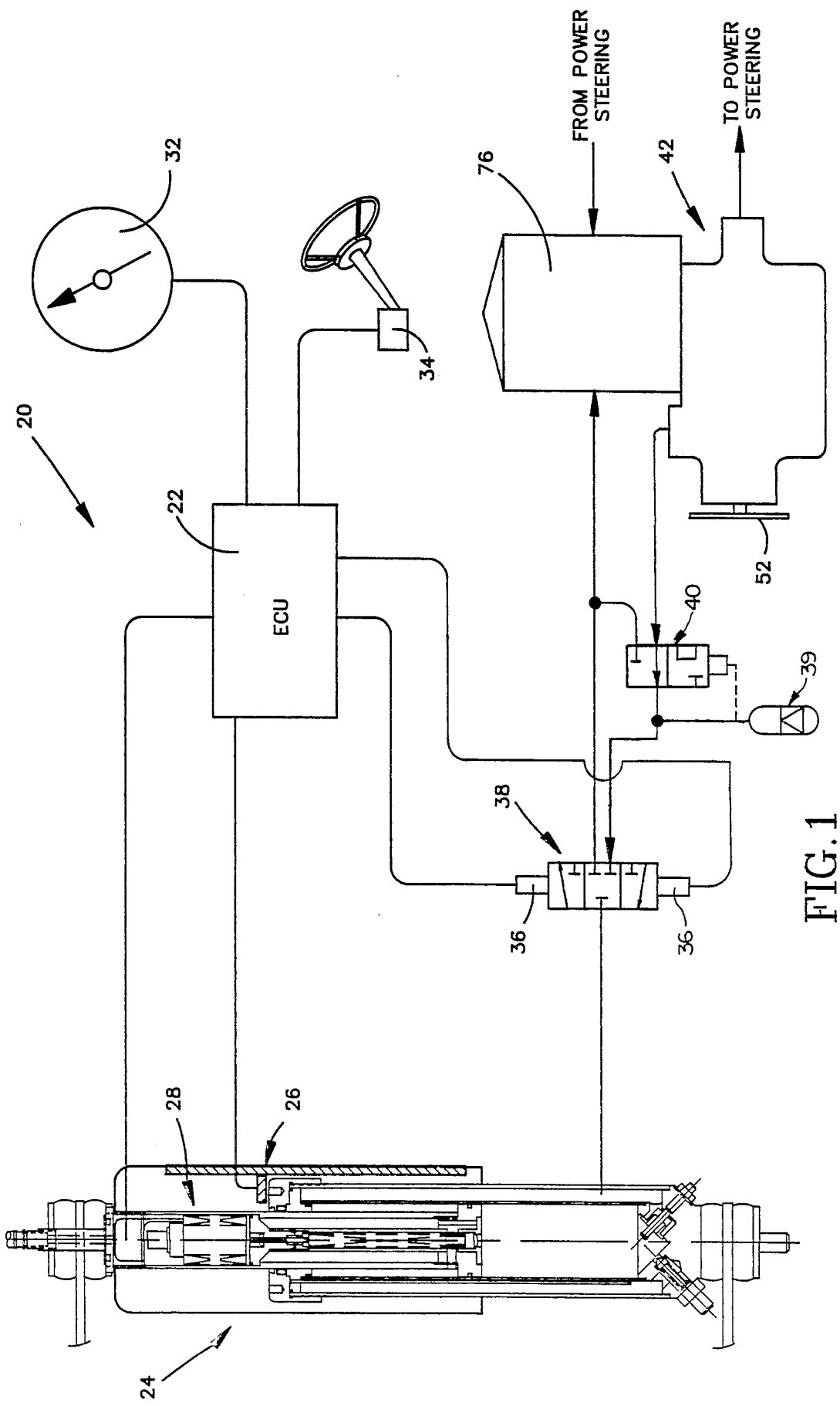
FIG. 1 is a schematic view of a portion of an adjustable fluid suspension and damping system embodying the present invention.

A portion of an adaptable fluid suspension and damping system 20 embodying the present invention is illustrated in FIG. 1. The adaptable fluid suspension and damping system 20 is for use on an automotive vehicle. The adaptable fluid suspension and damping system 20 includes an electronic control unit (ECU) 22 for monitoring sensors which detect various vehicle operating conditions and for controlling the damping rate and length of a strut 24 in response to data received from the sensors. The ECU 22 is in electrical communication with a strut length sensor 26, a vehicle speed sensor 32, and a steering sensor 34. The ECU 22 is connected in electrical communication with a solenoid 28 carried by the strut 24 to control the damping rate of the strut. The ECU is also connected in electrical communication with solenoids 36 of a fluid flow control valve 38 for maintaining a constant chassis height under different vehicle loads.

While only one strut 24 and one fluid flow control valve 38 are illustrated in FIG. 1, it should be apparent that more than one strut is typically used on a vehicle. Preferably, one strut would be located at each vehicle wheel position. Alternatively, a vehicle may have a pair of struts 24 connected with a respective one of the front wheels of the vehicle or a pair of struts connected with a respective one of the rear wheels of the vehicle. It should also be apparent that each strut 24 requires a separate fluid flow control valve 38.

The fluid suspension and damping system 20 also includes a pump 42. The pump 42 is in fluid communication with the vehicle power steering system (not shown) and is connected for fluid communication with the strut 24 through the fluid flow control valve 38. The fluid flow control valve 38 is a three-position valve. One of the positions of the valve 38 permits fluid to flow from the pump 42 to the strut 24. Another of the positions of the valve 38 permits fluid flow from the strut 24 to a tank of reservoir 76 of the pump 42. Yet another position of the valve 38 blocks all fluid flow between the pump 42 and strut 24.

Interposed between the pump 42 and the valve 38 are an accumulator 39 and an unloading valve 40. The accumulator 39 and unloading valve 40 are conventional. Therefore, they will not be described in detail.

The pump 42 has two separate pumping sections 60, 62 (FIG. 9). The two pumping sections 60, 62 operate independently so fluid delivery to the fluid suspension and damping system 20 or to the power steering system is not dependent on the other system. Thus, upon large fluid demands of one system or failure of one of the pumping sections, the other system may still operate. Further, a separate pump, other than the power steering pump, could be used which delivers fluid only to the fluid suspension and damping system.

The pump 42 (FIG. 9) is preferably attached to a vehicle engine in a known manner. The pump 42 is driven by a pump pulley (not shown) attached to a flange 52. The pump pulley is drivingly connected, in a conventional manner such as by a belt, with another pulley connected with the crankshaft of the engine. The flange 52 (FIG. 9) is fixed on a shaft 54 in a known manner. The shaft 54 extends through the first pumping section 60 and into the second pumping section 62.

The first pumping section 60 includes a plurality of pistons 64 disposed within respective cylinders 65 in a radial array about the shaft 54. The pistons 64 are driven radially by a cam 66 fixed to the shaft 54 and thus reciprocate within the cylinders 65. The reciprocating motion of the pistons 64 causes the volume of working chambers 67 defined by the pistons and cylinders 65 to expand and contract. During contraction of a working chamber 67, the fluid within that chamber is pressurized. The working chambers 67 communicates with an outlet port 68 which is connected in fluid communication with the strut 24 through the fluid flow control valve 38.

The second pumping section 64 is a vane type pump. A rotor 72 is fixed to an axial end portion of the shaft 54. The rotor 72 is driven by the shaft 54 to pressurize fluid in a working chamber 73. An outlet port 74 is in fluid communication with the working chamber 73 and the power steering system of the vehicle. The specific structure of the pumping sections 60, 64 could be other than described above.

Both the strut 24 and the power steering system have fluid return lines connected with the reservoir 76 of the pump 42. Both the first and second pumping sections 60, 62 of the pump 42 draw fluid from the reservoir 76. A filter 78 is disposed in the bottom of the reservoir 76 to prevent contaminants in the fluid from entering the pumping sections 60, 62. The fluid is preferably a relatively incompressible hydraulic fluid suitable for use in both the strut 24 and in the power steering gear.

The strut 24 (FIG. 2) is connected between parts 82, 84 of the vehicle. For example, the strut 24 is connected, at its upper end as viewed in FIG. 2, to a vehicle frame or body part 82. The strut 24 is also connected, at its lower end, to a vehicle axle or spindle 84. The parts 82, 84 are movable relative to one another in a direction generally along the line indicated by the longitudinal central axis A of the strut 24. The length of the strut 24 is adjustable to establish the distance between the parts 82, 84. The strut 24 also damps relative movement between the parts 82, 84 with a variable damping rate.

The strut 24 includes a housing (outer tubular member) 92 and a cylinder (inner tubular member) 94. The inner surface of the housing 92 and outer surface of the cylinder 94 define a fluid reservoir 98. A fluid chamber is defined by the inner surface 96 of the cylinder 94 and is disposed concentrically of the fluid reservoir 98. The housing 92 and cylinder 94 are radially spaced apart by upper and lower end caps 99, 100, respectively. A retainer nut 105 is threaded onto the housing 92 in a conventional manner, such as by an appropriate spanner wrench engaging the spanner holes 107. The retainer nut 105 maintains the upper end cap 99 in an axial position relative to the housing 92 and cylinder 94.

The fluid reservoir 98 has an elastic diaphragm 112 attached to the inner surface of the housing 92 and to the outer surface of the cylinder 94. The diaphragm 112 separates hydraulic fluid in the lower portion of the fluid resevoir 98 from gas in a gas chamber 113 in the upper portion of the fluid reservoir. The gas chamber 113 has a fixed charge of pressurized nitrogen gas. The nitrogen gas in the gas chamber 113 pressurizes the fluid in the lower portion of the fluid reservoir 98.

A piston 102 is disposed within the cylinder 92 and divides the fluid chamber defined by the inner surface 96 of the cylinder 94 into a first fluid chamber portion 104 and a second fluid chamber portion 106. A seal 108 is disposed in an annular groove in the outer circumference of the piston 102 to prevent fluid leakage between the first and second fluid chamber portions 104, 106. The piston 102 and cylinder 94 are relatively movable in compression and expansion strokes. Relative movement of the piston 102 and cylinder 94 along the axis A of the strut 24 displaces fluid which damps relative movement of the parts 82, 84 and establishes the length of the strut 24.

The piston 102 is connected with the part 82 for movement with the part 82 by a piston rod 122. The cylinder 92 is connected with the part 84 for movement with the part 84. Elastomeric bushings 124 are disposed between the strut 24 and the respective parts 82, 84. The type of mounting used to connect the strut 24 to the parts 82, 84 is not intended to limit the use of the strut. It should be apparent that other types of mountings can be used.

The housing 92 has an inlet port 132 for fluid communication with fluid flow control valve 38 and fluid reservoir 98. The fluid reservoir 98 is connected for fluid communication with the first fluid chamber portion 104 through a passage 134 (FIG. 3) in the lower end cap 100. An intake valve 136 is disposed within the passage 134. The valve 136 engages a seat 138 to block fluid flow from the first chamber portion 104 to the fluid reservoir 98. A spring 142 biases the valve 136 against the seat 138. The spring 142 has a relatively low rate. The rate of the spring 142 establishes a predetermined pressure differential between the fluid resevoir 98 and the first fluid chamber portion 104 that is required to move the valve 136 off of the seat 138.

Figure 3:
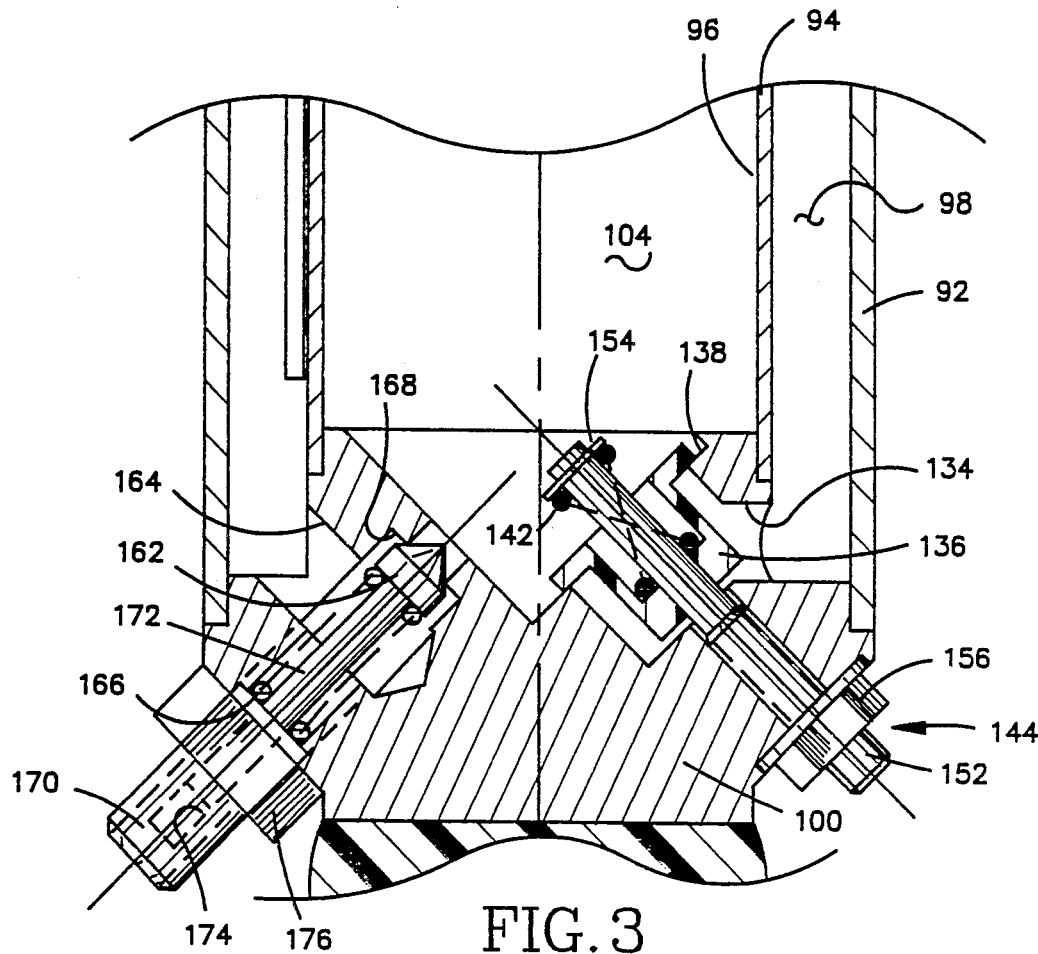
FIGS. 3-5 are enlarged views of portions of the strut of FIG. 2.

When the fluid pressure in the fluid reservoir 98 exceeds the fluid pressure in the first fluid chamber portion 104 by the predetermined amount, for example 1 psi, the valve 136 will move from the position illustrated in FIG. 3 to the position illustrated in FIG. 6. Fluid flows from the fluid reservoir 98 into the first fluid chamber portion 104. When the fluid pressure in the first fluid chamber portion 104 is equal to or greater than than the pressure in the fluid reservoir 98, the valve 136 is urged against the seat 138 to prevent fluid flow between the first fluid chamber portion 104 and the fluid reservoir 98 by the fluid pressure and biasing force of the spring 142.

In the illustrated embodiment, the pressure differential at which valve 136 unseats may be varied by increasing or decreasing the length of the spring 142 to vary the biasing force of the spring 142. This may be accomplished by an adjusting mechanism 144. An elongate member 152 of the adjusting mechanism 144 is threaded into the lower end cap 100 of the strut 24. The elongate member 152 supports the valve 136 for axial movement along the member 152. The member 152 has a retainer clip 154 disposed in a groove at an axial end portion of the member 152 to retain the spring 142 between the retainer clip and the valve 136.

The member 152 may be threaded into or out of the end cap 100. This respectively increases or decreases the effective length of the spring 142 to thereby decrease or increase the biasing force of the spring. Thus, the pressure differential between the reservoir 98 and first fluid chamber portion 104 required to unseat the valve 136 can be varied. The adjusting mechanism 144 also includes a jam nut 156 threaded over the elongated member 152 and against the end cap 100 to maintain the elongated member in the adjusted position. While the pressure at which valve 136 unseats may be adjusted in the illustrated embodiment, the adjustment may not be necessary for a given installation, and thus may be omitted.

To extend the strut 24, the first fluid chamber portion 104 must be expanded. When fluid flows from the fluid reservoir 98 into the first fluid chamber portion 104, a force is exerted on the piston 104 tending to expand the first fluid chamber portion. Thus, the fluid pressure in the fluid reservoir 98 may be used to control the extension of the strut 24, and to develop forces to augment the load capacity of the primary suspension springs acting between parts 82, 84.

The strut 24 carries the length sensor 26 (FIG. 1). The length sensor 26 detects compression or extension of the strut 24 from a reference or static position and communicates the length of the strut to the ECU 22. The length of the strut 24 is directly proportional to the distance between the parts 82, 84. The length sensor 26 is preferably a linear variable differential transformer (LVDT), but may be any suitable position sensor. Thus, the relative distance between the parts 82, 84 is constantly monitored and communicated to the ECU 22 for processing.

Figure 10:
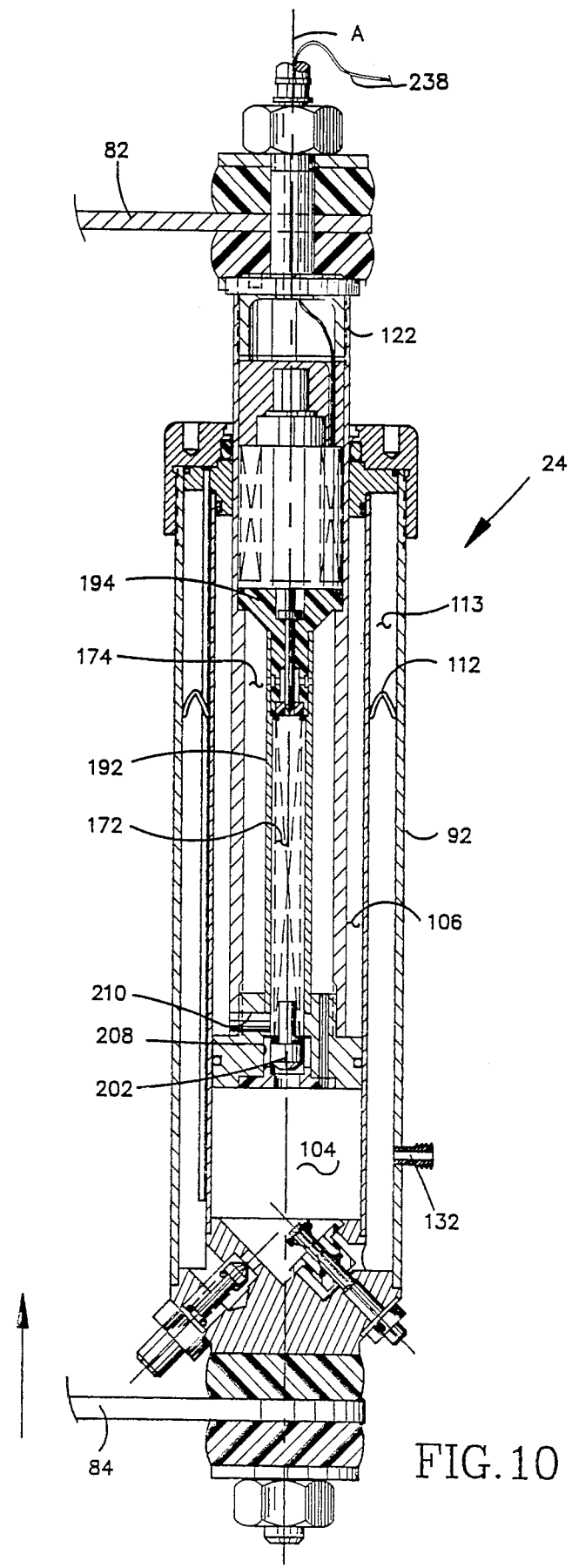
FIGS. 10 and 11 are views of the strut of FIG. 2 in different positions.

The ECU 22 monitors the length sensor 26 to determine if the vehicle is at a predetermined height or level as programmed. For example, if the vehicle is heavily loaded or is tending to roll during a turn, the ECU 22 determines that the distance between the parts 82, 84, as represented by the length of the strut 24, is reduced from a predetermined programmed length, as illustrated in FIG. 10. The ECU 22 then generates an electrical signal which is conducted to the solenoid 36 connected with the fluid flow control vave 38. The fluid flow control valve 38 is actuated to permit fluid from the pump 42 to enter the fluid reservoir 98 of the strut 24 at a pressure which is higher than that in the first fluid chamber portion 104 plus the bias of the spring 142. This allows the higher pressure to enter the first fluid chamber portion 104 which will tend to resist compression of the strut 24 or extend the strut.

The pressurized fluid flows into the first fluid chamber portion 104 and exerts a force on the piston 102 to extend the strut 24. When the strut 24 has extended to the predetemined length, the electrical signal generated by the ECU 22 and conducted to the solenoid 36 is discontinued to close the control valve 38 to block fluid flow to the fluid reservoir 98. Alternatively, if the vehicle becomes unloaded suddenly, for example by removing a heavy load, the ECU 22 determines that the length of the strut 24 has increased and the ECU will generate an electrical signal which is conducted to the solenoid 36 to move to the fluid flow control valve 38 to vent the fluid reservoir 98 to the tank 76 of the pump 42. When the predetermined length of the strut 24 has been reached, venting to the tank 76 is blocked.

The ECU 22 also monitors the steering sensor 34 and determines when a steering maneuver is occurring. The ECU 22, thus, may be programmed to respond to roll (which occurs during a steering maneuver) of the vehicle. The ECU 22 may increase the length of the strut 24 as described above (or all struts on one side of the vehicle) to counteract compression of the strut (or struts) due to vehicle roll during a steering maneuver.

A relief valve 162 (FIG. 3) is also located within a passage 164 in the lower end cap 100. The valve 162 engages a seat 168 to block fluid communication from the first fluid chamber portion 104 to the fluid reservoir 98. A spring 166 biases the valve 162 against a seat 168. The relief valve 162 includes an elongated cylindrical body 172. The body 172 is axially movable within an opening 174 in a threaded member 170. When the fluid pressure in the first fluid chamber portion 104 overcomes the biasing of the spring 166 the valve 162 moves, from the position illustrated in FIG. 3 to the position illustrated in FIG. 7, allowing fluid flow into the fluid reservoir 98. When the relief valve 162 opens to permit fluid flow into the fluid reservoir 98, the pressure of the nitrogen in the gas chamber 113 resists the fluid flow.

When fluid flow occurs from fluid chamber 104 past valve 162 into the reservoir 98, the pressure required to open valve 162 acts on piston rod 122 and piston 104 in a manner to resist or damp movement of parts 82, 84 toward each other.

The pressure differential at which the valve 162 opens may be adjusted by varying the biasing force of the spring 166. This may be accomplished by turning the threaded member 170 which lengthens or shortens the effective length of the spring 166 to respectively decrease or increase the rate of the spring. The rate of the spring 166 is selected so the valve 162 unseats at a relatively large pressure differential, for example 100 psi, between the first fluid chamber portion 104 and the fluid reservoir 98. A jam nut 176 is threaded over the threaded member 170 and against the lower end cap 100 to maintain the threaded member in the adjusted position. Alternatively, a solenoid may be adapted to apply a biasing force to the relief valve 162. The solenoid may be controlled by the ECU 22 to apply a variable force to the relief valve 162.

When the parts 82, 84 are moved toward one another along the line A, the strut 24 is compressed and the piston 102 moves relative to the cylinder 94 in a compression stroke. Compression of the strut 24 is resisted by the fluid pressure in the fluid reservoir 98. The damping force or resistance to a compression stroke of the strut 24 is, thus, the fluid pressure at which the relief valve 162 opens multiplied by the net area over which that fluid pressure acts on the piston 102 (the area of the piston in the first fluid chamber portion 104 less the area of the piston in the fluid chamber portion 106).

Figure 4:
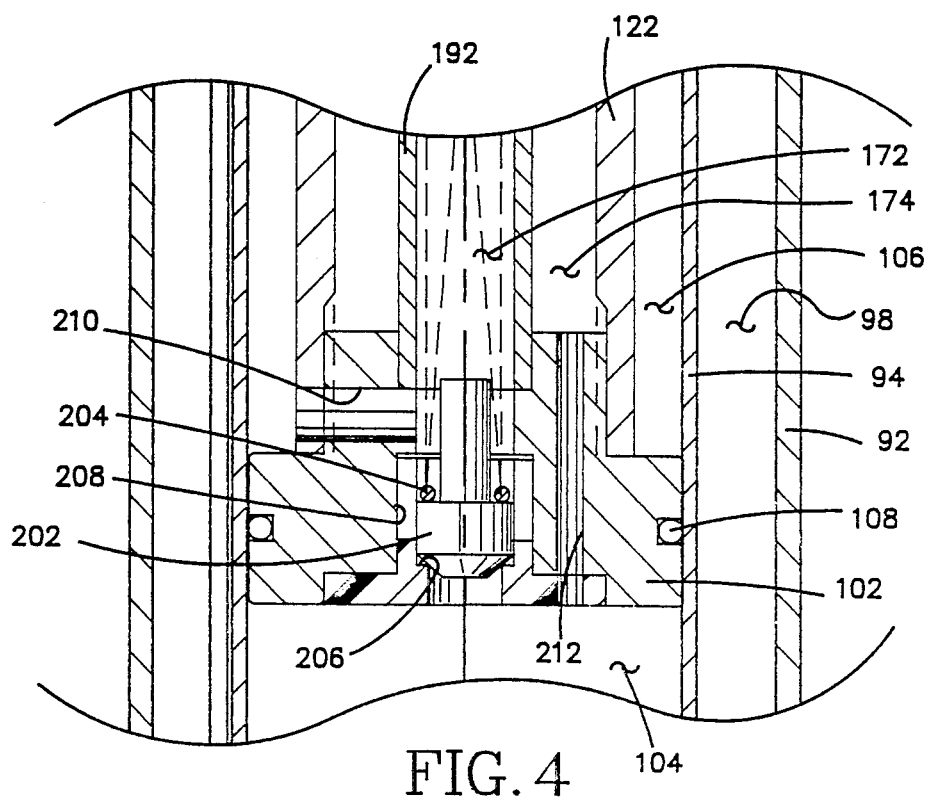

The piston 102 carries a check valve 202 (FIG. 4). The check valve 202 is axially movable within the piston 102. The check valve 202 is biased by a spring 204, of a relatively low rate, against a seat 206 in the piston 102. The spring 204 permits the valve 202 to unseat when a pressure in a first fluid chamber portion 104 exceeds the fluid pressure in the second fluid chamber portion 106 by a predetermined amount corresponding to the biasing force of the spring, for example approximately 2 or 3 psi. During compression of the strut 24, when the pressure in the first fluid chamber portion 104 exceeds the predetermined amount, the check valve 202 opens to permit fluid flow from the first fluid chamber portion 104 into the second fluid chamber portion 106. The fluid flows through axially extending slots 208 and passage 210 so that no fluid void is created by the expanding volume of the second fluid chamber portion 106. Since the rate of the spring 204 is considerably less than that of the spring 166, the check valve 202 opens before the relief valve 162 during a compression stroke of the strut 24.

The piston rod 122 (FIG. 2) moves axially within the second fluid chamber portion 106. The piston rod 122 is hollow and defines a pair of concentric fluid chambers 172, 174. The inner fluid chamber 172 is defined by an inner tubular member 192 carried between the piston 102 and a valve body 194. The outer fluid chamber 174 is defined by the inner surface of the piston rod 122 and the outer surface of the inner tubular member 192. The valve body 194 radially spaces the inner tubular member 192 relative to the piston rod 122.

The outer fluid chamber 174 communicates freely with the first fluid chamber portion 104 through passage 212 (FIG. 4) in the piston 102. The second fluid chamber portion 106 freely communicates with the inner chamber portion 172 through passage 210 in the piston 102. The inner fluid chamber 172 fluidly communicates with the outer fluid chamber 174 through a passage 216 (FIG. 5).

The passage 216 is disposed within the valve body 194 connected with the piston rod 122. The valve body 194 supports an elongate pintle valve 224 within a portion of a passage 216. The diameter of the elongate body of the pintle valve 224 is sized to closely fit within the opening 228 in the valve body 194 to block fluid flow between the inner and outer fluid chambers 172, 174. The pintle valve 224 has a tapered end surface 226 extending axially from a lower end of the pintle valve, as illustrated in FIG. 5. While the pintle vave 224 is shown with a tapered end surface 226, other shapes of the pintle are possible as determined by the flow characteristics desired.

Figure 5:
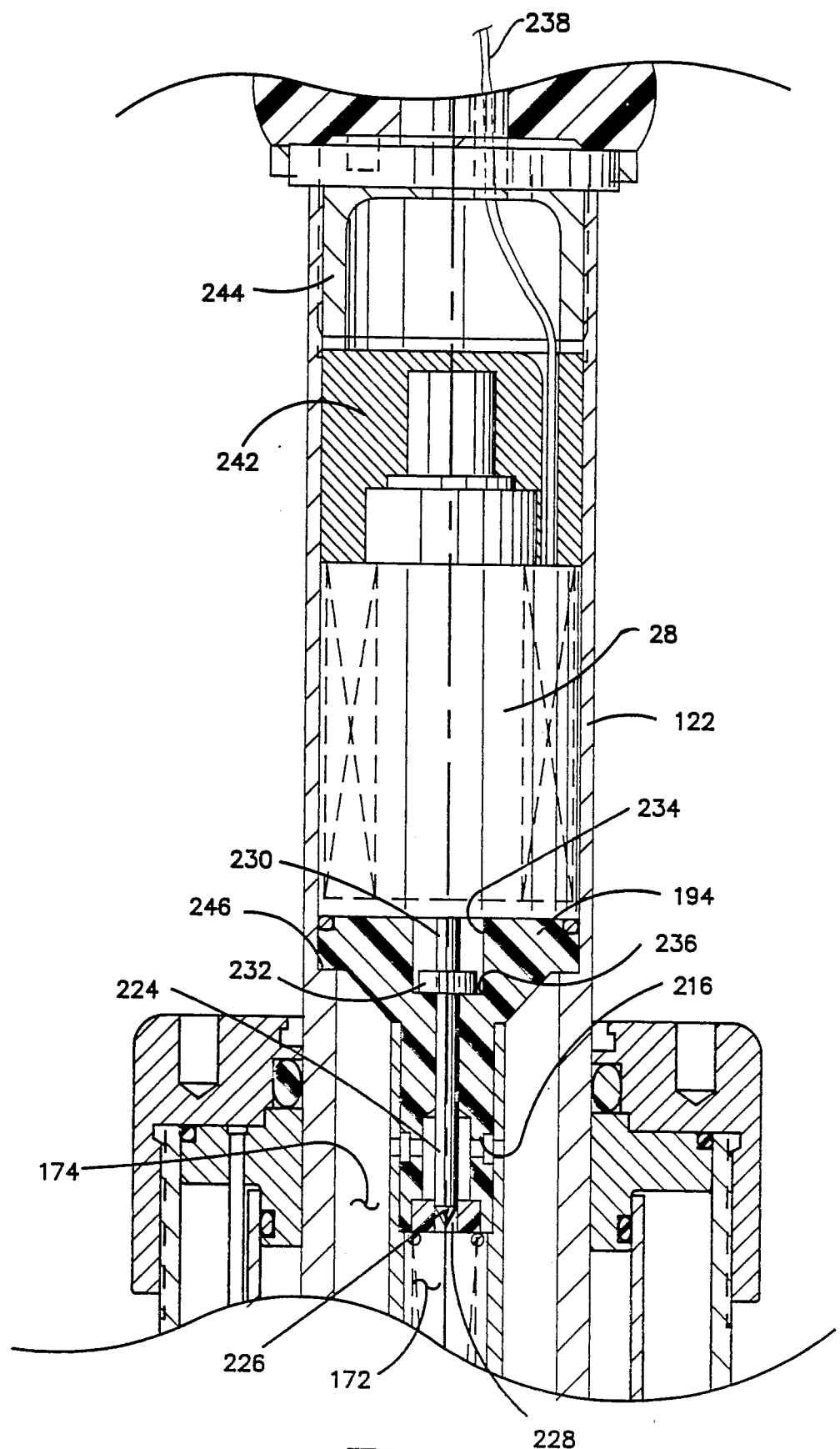

Fluid pressure in the inner fluid chamber 172 acts on the tapered end surface 226 of the pintle valve 224 to move the pintle valve upwardly, as viewed in FIG. 5. When the pintle valve 224 moves to a position where the shaped pintle end does not seal opening 228, such as the position illustrated in FIG. 8, fluid flows through the passage 216 from the inner fluid chamber 172 to the outer fluid chamber 174. The pintle vave 224 has a collar 232 fixed to its upper end. The collar 232 fits within an opening 234 in the valve body 194 and engages an end surface 236 of the opening to limit the travel of the pintle valve 224 downwardly, as viewed in FIG. 5.

The solenoid 28 is carried by the piston rod 122 and is movable therewith. The solenoid 28 is maintained in an axial position relative to the piston rod 122 by a block 242 and a nut 244 threaded into the upper end of the piston rod. The wires 238 extend from the solenoid 28 through openings in both the block 242 and nut 244. The nut 244 is threaded into the piston rod 122 forcing the block 242 against the solenoid 28. The solenoid 28, in turn, forces the valve body 194 against a shoulder 246 in the piston rod 122 to maintain the valve body 194, solenoid 28, and block 242 in a predetermined axial position within the piston rod.

An axially movable rod 230 (FIG. 5) is disposed within the solenoid 28 and engages the upper end of the pintle valve 224, as viewed in FIG. 5. The solenoid 28 is electrically actuatable by an electrical signal conducted over wires 238 to apply a force to the rod 230 tending to force it downwardly, as viewed in FIG. 5. The rod 230 applies the force to the pintle valve 224 to resist axial movement of the pintle valve, thereby blocking fluid flow through the opening 228. The force applied by the solenoid 28 to the rod 230 varies in proportion to a characteristic of the electric signal, such as voltage magnitude or pulse-width modulation. For example, as voltage conducted from the ECU 22 to the solenoid 28 increases, the force exerted by the rod 230 against the pintle valve 224 resisting pressure in the inner fluid chamber 172 also increases.

The pintle valve 224 moves axially, from the position illustrated in FIG. 5 toward the position illustrated in FIG. 8, when the pressure acting on the tapered end surface 226 exceeds the force applied by the solenoid 28. When the pintle valve 224 has moved so the major diameter of the elongate body of the pintle valve is no longer disposed within the opening 228, fluid flows from the inner fluid chamber 172 to the outer fluid chamber 174. Thus, fluid communication between the inner fluid chamber 172 and the outer fluid chamber 174 is controlled by the pintle valve 224 as a function of the force applied to it by the solenoid 28.

Figure 2:
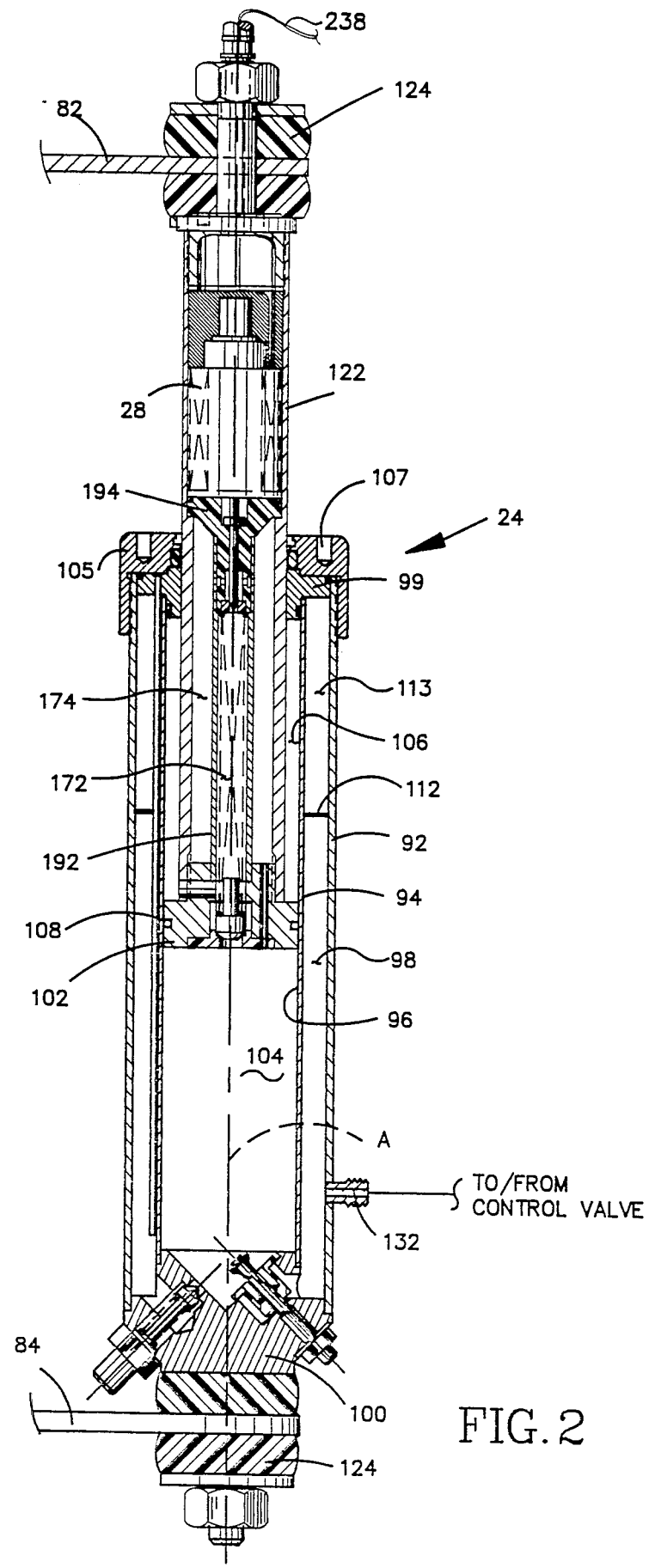
FIG. 2 is a sectional view of a strut embodied in the system of FIG. 1.
Figure 11:
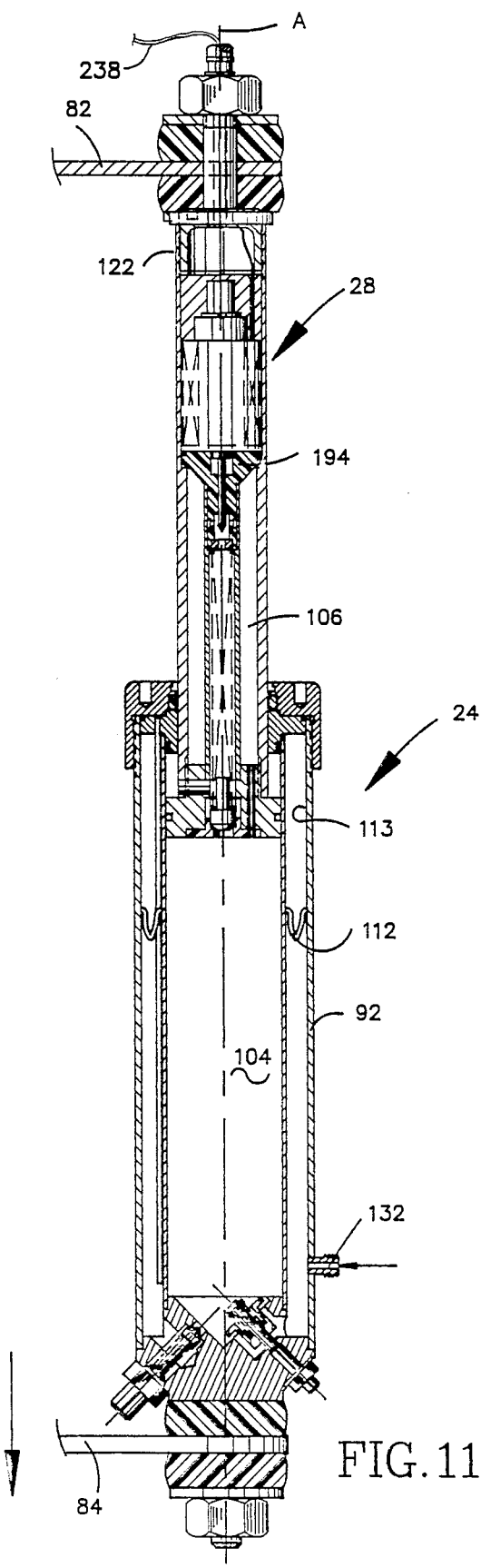

When the parts 82, 84 are moved away from one another in a direction along the axis A and the piston 102 moves upwardly within the cylinder 94, from the position illustrated in FIG. 2 to the position illustrated in FIG. 11, and the strut 24 extends or increases in length. Extension of the strut 24 corresponds to movement of the wheel of the vehicle as would occur when a vehicle spring associated with the strut and wheel forces the part 84 away from the part 82, for example, as when the wheel enters a pot hole. During extension of the strut 24, the second fluid chamber portion 106 is reduced in volume which increases the fluid pressure therein and the first fluid chamber portion 104 expands. Fluid flow from the inner fluid chamber 172 to the first fluid chamber portion 104 is blocked by the check valve 202 and by the pintle valve 224. Fluid flow from the inner fluid chamber 172 to the first fluid chamber portion 104 occurs when the pressure in the inner fluid chamber 172 overcomes the force of the solenoid 28 and moves the pintle valve 224.

It is often desirable to inhibit extension of the strut 24 (damping) to a greater degree as vehicle speed increases. The ECU 22 may determine vehicle speed from a speed sensor 32 connected with the vehicle transmission or speedometer. The ECU 22 may be programmed to automatically increase the damping rate for extension of the strut 24 as vehicle speed increases.

The solenoid 28 is connected with the ECU 22 (FIG. 1) to vary the damping rate of the strut 24 during extension as vehicle speed varies. An electrical signal is communicated from the ECU 22 to energize or actuate the solenoid 28. The ECU 22 generates changes in a characteristic of the electrical signal in response to sensing a change of at least one vehicle condition programmed into the ECU. The signal generated by the ECU 22 may vary in magnitude of one characteristic, such as voltage as determined by the program of the ECU 22. Thus, the force required to open the pintle valve 224 is varied in order to provide a variable damping rate during extension of the strut 24.

The configuration of the end surface 226 of the pintle valve 224 may also be varied. Thus, the damping rate of the strut 24 in extension can further be tailored by varying the angle of taper or area of the end surface 226 of the pintle valve 224 which is exposed to pressure in the inner fluid chamber 172.

The solenoid 28 controls the damping between the parts 82, 84 when the strut 24 attempts to extend. When the ECU 22 determines that a greater amount of damping is required, either by program control or by the operator selecting a mode switch 300 (FIG. 12) on a control module that a stiffer ride is desired, the ECU then applies a higher voltage to the solenoid 28. The solenoid 28 then applies a larger force to the pintle vave 224 thereby requiring more pressure in the inner fluid chamber 172 to unseat the pintle valve and permit fluid flow between the inner fluid chamber 172 and the outer fluid chamber 174 during expansion of the strut 24. Fluid communicated to the outer fluid chamber 174 in this manner may then freely enter the first fluid chamber portion 104 in order to prevent any fluid void that may result in the first fluid chamber portion because of expansion thereof during extension of the strut 24.

Figure 12:
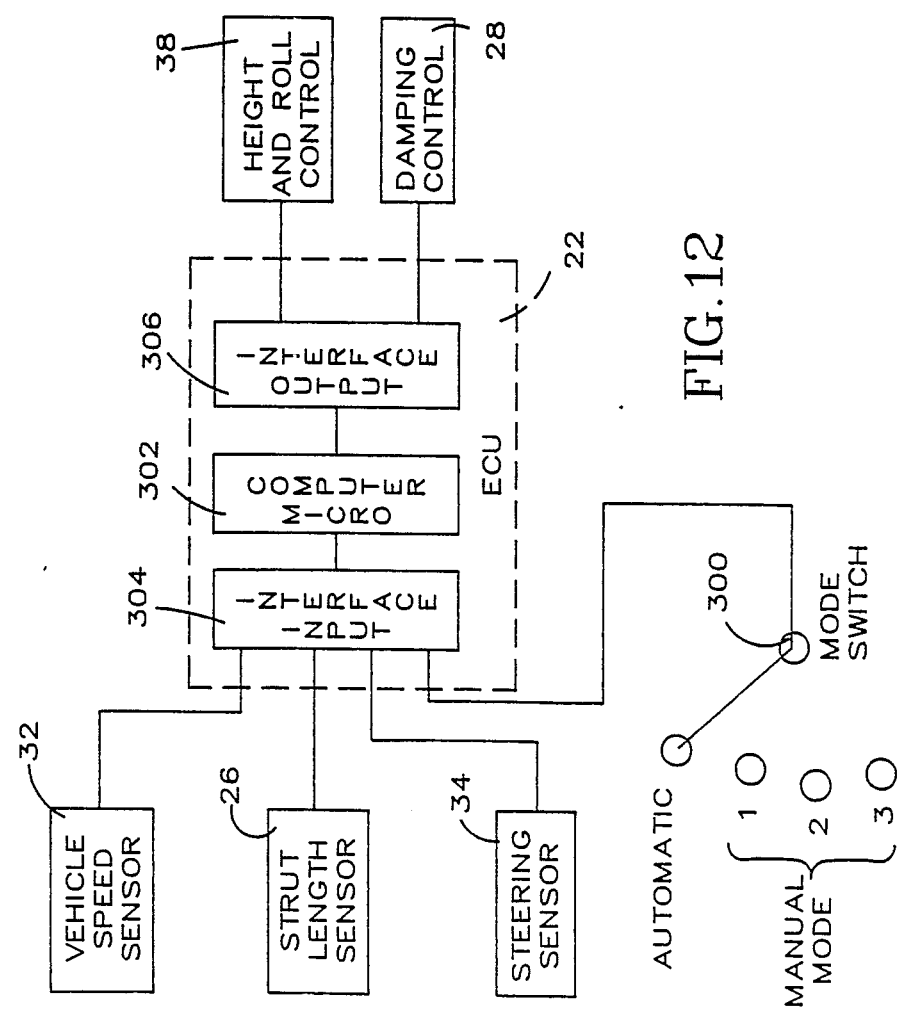
FIG. 12 is a schematic illustration of the electronic control unit of FIG. 1.

FIG. 12 is a schematic illustration of the electronic control unit (ECU) 22 for use with the adjustable fluid suspension and damping system 20. The electronic control unit (ECU) 22 includes a microcomputer 302, an input interface 304 and an output interface 306. The microcomputer 302 includes random access memory (RAM), read only memory (ROM), and a microprocessor. The RAM stores various vehicle and control data. The ROM stores the control program. The microprocessor processes the data in the RAM according to the program stored in the ROM.

The input interface 304 communicates with the vehicle speed sensor 32, the strut length sensor 26, the steering sensor 34, and the mode switch 300. The input interface 304 communicates data from the sensors 26, 32, 34 and switch 300 to the microcomputer 302. The mode switch 300 may be a switch on the vehicle instrument panel which is manually selectable by the vehicle operator among a plurality of modes. For example, the automatic mode may be selected by the operator to permit a computer program to select damping rates of the strut 24. The manual mode may be manually selected to provide, for example a soft (1), moderate (2), or firm (3) ride.

The output interface 306 communicates electrical control signals from the microcomputer 302 to the appropriate solenoid 28, 38. The output interface 306 communicates with the solenoid 36 of the control valve 38 for establishing the vehicle height and road characteristics. The output interface 306 communicates with the solenoid 28 to control the damping rates of the strut 24.

Figure 13:
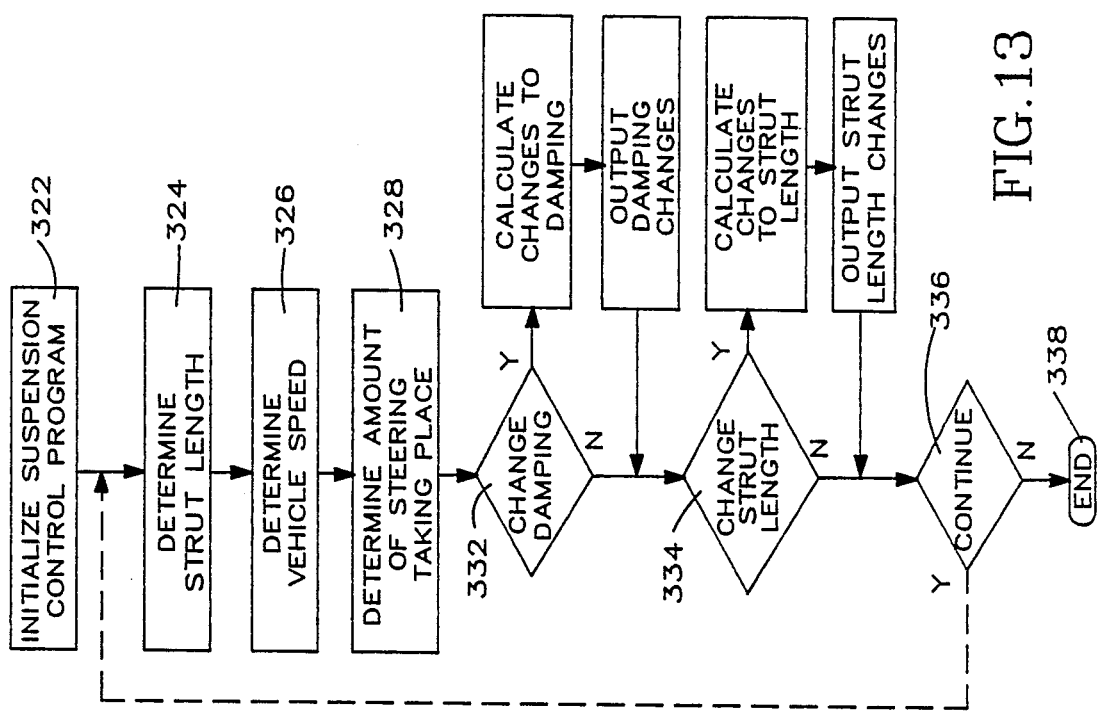
FIG. 13 is a flow diagram of the control program for the electronic control unit.

FIG. 13 is a flow diagram of the program that the ECU 22 uses for controlling the damping rate and length of the strut 24. The first step that the ECU 22 performs is to initialize the control program, illustrated at block 322. To initialize the control program, the ECU 22, for example, may determine that the ignition switch of the vehicle has been switched on. The ECU 22 then determines the length of the strut 24 at block 324. At block 326, the ECU 22 then determines the vehicle speed relative to a reference surface, such as the road the vehicle is travelling on. At block 328, the ECU 22 determines the amount of steering taking place. The ECU 22 uses these determinations as parameters for decision making in the control program.

At block 332, the ECU 22 determines if it is necessary to change the damping rate of the strut 24. For example, the control program may include logic to increase the damping rate of the strut if the vehicle speed is greater than 45 mph. If the ECU 22 determines that a change in damping rate of the strut 24 is necessary, the ECU calculates the new damping rate and then generates an electrical output signal which is proportional to the amount of force to be applied to the solenoid 28 to the pintle valve 224. The output signal is then conducted to the solenoid 28. If no change in damping rate is required or if the damping rate change has already been made, the ECU 22 determines if a change in the length of the strut 24 is necessary at block 334.

If a change in the length of the strut 24 is necessary, the ECU 22 will calculate the changes. An electrical signal output is generated corresponding to the position to which the solenoid 36 of the control valve 38 is to move. If no change in the length of the strut 24 is required or if the change has already been made, the ECU 22 determines if it should continue monitoring the sensors and determining changes.

If the ECU 22 determines that, at block 336, it is to continue monitoring certain vehicle conditions as sensed by the sensors 26, 32, 34, it will re-enter the program just before block 324. If no more monitoring is necessary, the program ends at block 338. A condition in which no more monitoring is necessary is when the ECU 22 determines that the vehicle ignition has been turned off.

From the above description of a preferred embodiment of the invention, those skilled in the art will perceive improvements, changes and modifications. Such improvements, changes and modifications within the skill of the art are intended to be covered by the appended claims.

Having described a specific preferred embodiment of the invention, the following is claimed:

1. An apparatus for damping relative movement of parts, said apparatus comprising a cylinder defining a fluid chamber, a piston located in said fluid chamber and dividing said fluid chamber into first and second fluid chamber portions, said piston being connected to one of the parts and said cylinder being connected to the other of the parts, said piston and cylinder moving relatively in compression and expansion strokes to damp relative movement of the parts, means defining a fluid reservoir having fluid communication with said first fluid chamber portion, a first valve for controlling flow from said first fluid chamber portion into said fluid reservoir upon movement of said piston and cylinder during a compression stroke, a first passage through which fluid flows from said first fluid chamber portion to said second fluid chamber portion, a second passage through which fluid flows from said second fluid chamber portion to said first fluid chamber portion, damping control means for providing a variable damping force for resisting movement of said piston and cylinder during an expansion stroke and including a second valve movable with said piston, said second valve being movable relative to said piston between a closed position in which fluid does not flow through said second passage, and an open position in which fluid flows from said second fluid chamber portion to said first fluid chamber portion through said second passage, in response to fluid pressure in said second fluid chamber portion for controlling the fluid flow from said second fluid chamber portion to said first fluid chamber portion through said second passage, means for applying a variable force resisting opening of said second valve, and a check valve movable with said piston for controlling the fluid flow from said first fluid chamber portion to said second fluid chamber portion through said first passage and which opens in response to fluid pressure in said first fluid chamber portion, said check valve enabling fluid flow from said first fluid chamber portion to said second fluid chamber portion through said first passage when said second valve is in its closed position.

2. The apparatus set forth in claim 1 wherein said means for applying a variable force includes an actuator connectable with said second valve, said actuator being operable in response to an electric signal to apply said variable force to said second valve for resisting opening of said second valve.

3. The apparatus set forth in claim 2 wherein said actuator is a solenoid which is operable in response to the magnitude of a characteristic of the electrical signal to apply a force to said second valve in proportion to the magnitude of the characteristic of the electrical signal.

4. The apparatus set forth in claim 3 wherein the electrical signal is generated by an electronic control unit in response to sensor means sensing at least one condition of the parts.

5. The apparatus set forth in claim 4 wherein said sensor means includes a sensor for sensing the speed at which the parts are travelling relative to a reference surface.

6. The apparatus set forth in claim 1 further including a piston rod connected to said piston and for connection to one of the parts, and wherein said second valve includes an elongate body having a shaped surface extending axially from an end portion thereof, said second valve being disposed in a passage in said piston rod and being axially movable in said passage, said passage having a portion for communicating fluid flow from said second fluid chamber portion to said first fluid chamber portion, the fluid pressure in said second fluid chamber portion acting on said tapered surface to move said second valve from a position blocking fluid flow from said second fluid chamber portion to said first fluid chamber portion to a position allowing fluid flow from said second fluid chamber portion to said first fluid chamber portion.

7. An apparatus for damping movement of parts, said apparatus comprising a cylinder defining a fluid chamber, a piston located in said fluid chamber and dividing said fluid chamber into first and second fluid chamber portions, a piston rod connected to said piston and extending through said second fluid chamber portion, said piston rod being connected to one of the parts and said cylinder being connected to the other one of the parts, said piston and cylinder moving relatively in compression and expansion strokes to damp movement of the parts, means defining a fluid reservoir having fluid communication with said first fluid chamber portion, means defining a gas chamber containing a fixed gas charge acting on the fluid in said fluid reservoir, a first valve for controlling fluid flow from said first fluid chamber portion into said fluid reservoir upon movement of said piston and cylinder during said compression stroke, a solenoid controlled second valve movable between closed and open positions for controlling fluid flow from said second fluid chamber portion to said first fluid chamber portion during an expansion stroke and which opens in response to fluid pressure in said second fluid chamber portion, a third valve for controlling fluid flow from said fluid reservoir into said first fluid chamber portion during an expansion stroke, and a check valve for controlling fluid flow from said first fluid chamber portion to said second fluid chamber portion, said check valve enabling fluid flow from said first fluid chamber portion to said second fluid chamber portion in the closed position of said second valve.

8. The apparatus set forth in claim 7 wherein said solenoid applies a force acting on said second valve against fluid pressure in said second fluid chamber and which force varies in proportion to the magnitude of a characteristic of an electric signal received by said solenoid.

9. The apparatus set forth in claim 8 further including an electronic control unit for generating the electrical signal in response to sensor means sensing at least one condition of the parts.

10. The apparatus set forth in claim 9 wherein said sensor means includes a sensor for sensing the speed at which the parts are travelling relative to a reference surface.

11. The apparatus set forth in claim 7 further including a spring for applying a force to close said first valve blocking fluid flow from said first fluid chamber portion to said fluid reservoir and means for adjusting the rate of said spring to change the force applied to said first valve including means for varying the effective length of said spring to vary the pressure in said first fluid chamber portion required to open said first valve.

12. An apparatus for damping movement of parts, said apparatus comprising a cylinder defining a fluid chamber, a piston located in said fluid chamber and dividing said fluid chamber into first and second fluid chamber portions, a piston rod connected to said piston and extending through said second fluid chamber portion, said piston and cylinder moving relatively in compression and expansion strokes to damp movement of the parts, said piston rod defining a pair of concentric fluid chambers, one of said pair of concentric fluid chambers communicating freely with said first fluid chamber portion, the other of said pair of concentric fluid chambers communicating with said second fluid chamber portion, a check valve interposed between said other of said pair of concentric fluid chambers and said first fluid chamber portion, and a solenoid controlled valve for controlling fluid flow interposed between said pair of concentric fluid chambers.

13. The apparatus set forth in claim 12 wherein said check valve is biased to block fluid flow from said first fluid chamber portion to said one of said pair of concentric fluid chambers and which bias force is overcome by fluid pressure in said first fluid chamber portion to allow fluid flow from said first fluid chamber portion to said one of said pair of concentric fluid chambers.

14. The apparatus set forth in claim 12 wherein said solenoid controlled valve is carried by said piston rod and is movable within a passage from a position blocking fluid flow between said pair of concentric fluid chambers to a position allowing fluid from therebetween within said passage.

15. The apparatus set forth in claim 14 further including sensor means and an electronic control unit for generating an electrical signal having a characteristic which varies in magnitude in response to said sensor means sensing at least one condition of the parts, the force applied to said solenoid controlled valve for resisting movement thereof to a position allowing fluid flow between said pair of concentric fluid chambers varies in response to the magnitude of the electrical signal.

16. The apparatus set forth in claim 15 wherein said sensor means senses the distance between the parts.

17. The apparatus set forth in claim 15 wherein said sensor means senses the speed at which the parts are moving relative to a reference surface.

18. The apparatus set forth in claim 15 wherein said electronic control unit further includes means for manually selecting the magnitude of the electrical signal generated by said control unit.

19. An apparatus for damping relative movement of parts, said apparatus comprising a cylinder defining a fluid chamber, a piston located in said fluid chamber and dividing said fluid chamber into first and second fluid chamber portions, said piston being connected to one of the parts and said cylinder being connected to the other of the parts, said piston and cylinder moving relatively in compression and expansion strokes to damp relative movement of the parts, means defining a fluid reservoir having fluid communication with said first fluid chamber portion, a first valve for controlling flow from said first fluid chamber portion into said fluid reservoir upon movement of said piston and cylinder during a compression stroke, and damping control means for providing a variable damping force for resisting movement of said piston and cylinder during an expansion stroke including a second valve movable with said piston and relative thereto for controlling the fluid flow from said second fluid chamber portion to said first fluid chamber portion and which opens in response to fluid pressure in said second fluid chamber portion, and means for applying a variale force resisting opening of said second valve and comprising solenoid means comprising a solenoid and a member located within said solenoid and for engaging said second valve, said solenoid being actuatable to apply a variable force to said member to force said member into engagement with said second valve to resist opening of said second valve in response to fluid pressure in said second fluid chamber portion.

* * * * *

UNITED STATES PATENT AND TRADEMARK OFFICE
CERTIFICATE OF CORRECTION

PATENT NO. : 4,846,317
DATED : July 11, 1989
INVENTOR(S) : Bernard C. Hudgens

It is certified that error appears in the above-identified patent and that said Letters Patent is hereby corrected as shown below:

Column 12, Line 41, change "strokeand" to --stroke and--.

Column 14, Line 34, change "variale" to --variable--

Signed and Sealed this

Twenty-sixth Day of June, 1990

Attest:

HARRY F. MANBECK, JR.

*Attesting Officer*  *Commissioner of Patents and Trademarks*